Figure 1:
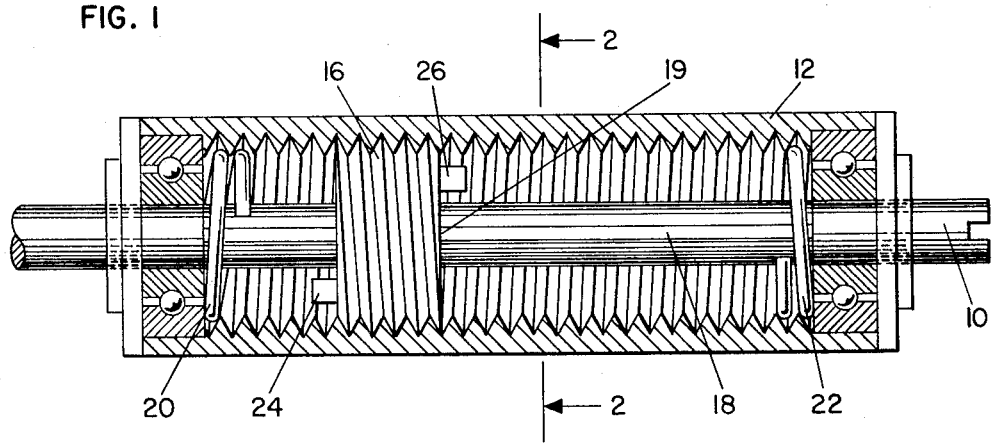

Dec. 27, 1966  C. R. LINSLEY  3,293,925

MULTI-TURN STOP MECHANISM

Filed Jan. 29, 1965

INVENTOR.
CLARENCE R. LINSLEY
BY
ATTORNEY

3,293,925
MULTI-TURN STOP MECHANISM
Clarence R. Linsley, La Crescenta, Calif., assignor to General Precision, Inc., a corporation of Delaware
Filed Jan. 29, 1965, Ser. No. 428,941
3 Claims. (Cl. 74—10.2)

The present invention relates to multi-turn stop mechanisms and more particularly to a novel and improved multi-turn stop mechanism for limiting the rotation of the shaft in either, or both, directions.

The improved assembly of the invention may be used for controlling the setting of precision potentiometers and other delicate low torque instruments. The assembly to be described avoids any likelihood of damage to the equipment with which it is associated, by inadvertent attempts to turn the control shaft beyond the desired range of angular movements.

In the prior art a multitude of stop mechanisms have evolved. One such is the hunting tooth stop mechanism which consists of a plurality of gears with stops thereon which meet after a number of revolutions. This type of stop mechanism, although very successful in its operation, is somewhat expensive to manufacture because of elaborate gear arrangement. Another type is the so-called jam nut limit stop. This device consists of a threaded shaft having a running nut engaged therewith. As the shaft rotates, the nut being nonrotatable will move along the shaft. A pair of stops are placed on either end of the shaft and when the running nut is jammed into stops, the mechanism is stopped. The disadvantage of this device is clearly obvious. The running nut actually becomes jammed or wedged against the stops making it difficult to back the shaft off.

Briefly described, the present invention provides a multi-turn stop mechanism comprising a rotatable shaft disposed axially within an internally threaded housing, an externally threaded running nut disposed on the shaft and engaging the internal threads, a pair of limit stops disposed on either side of the radial axis of the running nut and a pair of protruding ends disposed within the path of the stops on either end of said housing.

It is, therefore, an object of the present invention to provide an improved multiple turn control shaft assembly for use in conjunction with a wide range of instruments, and which incorporates a rugged stop mechanism for limiting the rotational travel of the control shaft and thereby avoiding damage to the instrument with which it is associated.

Another object of the invention is to provide such an improved assembly and stop mechanism, which is inexpensive and simple in its construction; and which is not susceptible to jamming, as is often the case, for example, with the more expensive and complicated prior art gear or jam nut type of stop mechanisms of the prior art.

Another object of the invention is to provide such an improved stop mechanism which is compact and whose space requirements are reduced to a minimum.

Figure 2:
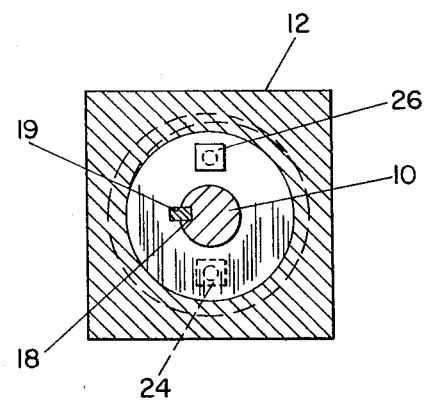

Other objects and advantages of the invention will become apparent from a consideration of the following description, when the description is taken in conjunction with the accompanying drawing, in which:

FIGURE 1, by way of example, is a sectional view of one embodiment of this invention;

FIGURE 2 is a sectional view taken along the lines 2—2 of FIGURE 1.

The control shaft assembly illustrated in the drawing includes a housing 12, the interior of which, as shown in FIGURE 1, is tubular and is internally threaded. A shaft 10 is rotatably mounted in housing 12 and extends along the longitudinal axis thereof from one end to the other. A running nut 16 is slidably mounted on shaft 10 and has external threads which engage the internal threads of the housing 12. Shaft 10 has a key way 18 extending along its length. A key 19 in the bore of nut 16 engages key way 18, thus preventing relative rotation between shaft 10 and nut 16. Therefore, as shaft 10 is rotated in either direction, the nut 16 is caused to rotate with the shaft 10 and move back and forth in the housing 12.

In accordance with the invention, such limit stops take the form of a pair of coil springs 20 and 22, which are mounted at opposite ends of housing 12 and may consist, for example, of only one or two turns, as shown. These springs may be constructed to lie within the threads of the housing therefore being adapted to advance within housing when rotated. A pair of stops 24 and 26 are mounted on nut 16 and protrude outwardly from the opposite ends thereof as shown, and each is displaced radially from the center of rotation of nut 16. Each of the springs 20 and 22 is constructed to have its inward end disposed in the path of a corresponding one of the stops 24 and 26. Therefore, as shaft 10 is rotated in a first direction, nut 16 advances toward spring 22, for example, and shaft 10 may be rotated in that direction until stop 26 comes against the protruding end of spring 22. When that occurs, a positive stop is provided, and shaft 10 is no longer able to be rotated in that direction. Likewise, when shaft 10 is rotated in the opposite direction, nut 16 advances toward spring 20 until the stop 24 contacts the protruding end of the spring 20. When that happens, shaft 10 can no longer be rotated.

It is evident that the assembly of the invention may be constructed for any desired number of permissible turns of shaft 10. This number can be established by an appropriate design of the coarseness or fineness of the internal threads in housing 12 and mating threads of nut 16. Moreover, the number of permissible turns of shaft 10 can be established by advancing either or both of the springs 20 and 24 toward one another by screwing them into the housing 12. This can be achieved, for example, by increasing the number of turns of the springs, or by the use of appropriate spacer mounts.

While a particular embodiment of the invention has been shown and described, modifications may be made. The following claims are intended to cover all modifications which fall within the scope of the invention.

What is claimed is:

1. In a multi-turn stop mechanism having an internally threaded housing, a control shaft rotatably mounted in said housing, a running nut slidably mounted on said shaft and having external threads engaging the internal threads of said housing, and keying means for causing said nut to rotate with said shaft as said shaft is turned in said housing, the combination of: at least one stop member mounted on said nut and protruding from one end thereof and displaced radially from the axis of rotation of said shaft to rotate about said axis with said nut; and a coil spring member mounted in said housing in coaxial relationship with the axis of rotation of said shaft and having a protruding end portion disposed in the path of said stop member to be contacted thereby at a limit of rotational movement of said shaft.

2. The combination defined in claim 1 in which said keying means includes a key on said nut and a key way for said key extending along said shaft.

3. In a multi-turn stop mechanism having an internally threaded housing, a control shaft rotatably mounted in said housing, a running nut slidably mounted on said shaft and having external threads engaging the internal threads of said housing, said shaft having a key way extending along the length thereof, and a key on said nut slidable in said key way for causing said nut to rotate with said shaft as said shaft is turned in said housing, the combination of: a pair of stop members mounted on opposite ends of said nut and protruding therefrom and displaced radially from the axis of rotation of said shaft to rotate about said axis with said nut; and a pair of coil spring members mounted at opposite ends of said housing in coaxial relationship with said shaft, each of said coil spring members having a protruding end portion disposed in the path of a corresponding one of said stop members to be contacted thereby at a corresponding limit of rotational movement of said shaft.

References Cited by the Examiner
UNITED STATES PATENTS
2,911,850  11/1959  Schmidt _____ 192—141

References Cited by the Applicant
UNITED STATES PATENTS
2,599,934  6/1952  Opocensky.
2,744,416  5/1956  Feigin.
2,823,561  2/1958  Opocensky.
3,121,210  2/1964  Orozco.

MILTON KAUFMAN, *Primary Examiner.*